(12) United States Patent
Matsumoto

(10) Patent No.: US 8,203,723 B2
(45) Date of Patent: Jun. 19, 2012

(54) IMAGE FORMING APPARATUS

(75) Inventor: Keigo Matsumoto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 890 days.

(21) Appl. No.: 12/268,493

(22) Filed: Nov. 11, 2008

(65) Prior Publication Data

US 2009/0122366 A1    May 14, 2009

(30) Foreign Application Priority Data

Nov. 14, 2007  (JP) .................................. 2007-295681

(51) Int. Cl.
*H04N 1/04* (2006.01)
*G03G 15/00* (2006.01)
(52) U.S. Cl. ........................ 358/1.12; 399/361; 399/367
(58) Field of Classification Search ................. 358/1.12; 399/81, 367, 107, 361
See application file for complete search history.

(56) References Cited

U.S. PATENT DOCUMENTS 7,194,219 B2 *   3/2007   Sato et al. ........................ 399/81

FOREIGN PATENT DOCUMENTS

JP        2007-096889 A      4/2007

* cited by examiner

*Primary Examiner* — Charlotte M Baker
(74) *Attorney, Agent, or Firm* — Panitch Schwarze Belisario & Nadel LLP

(57) ABSTRACT

An image forming apparatus is supplied which enables print medium to be simply taken out even if an interval between a print processing section and an image reading section is not sufficiently secured. In the image forming apparatus, an image reading section is furnished on the upside of a print processing section; an ejection opening is furnished between the image reading section and the print processing section for ejecting a medium that has been printed; a loading part is furnished between the image reading section and the print processing section and is used for loading the ejected medium. The loading part includes a body part, a movement member that is movable from the body part, and a guide section that guides the movement member to move from the body part along upward slant direction with respect to a horizontal plane.

16 Claims, 13 Drawing Sheets

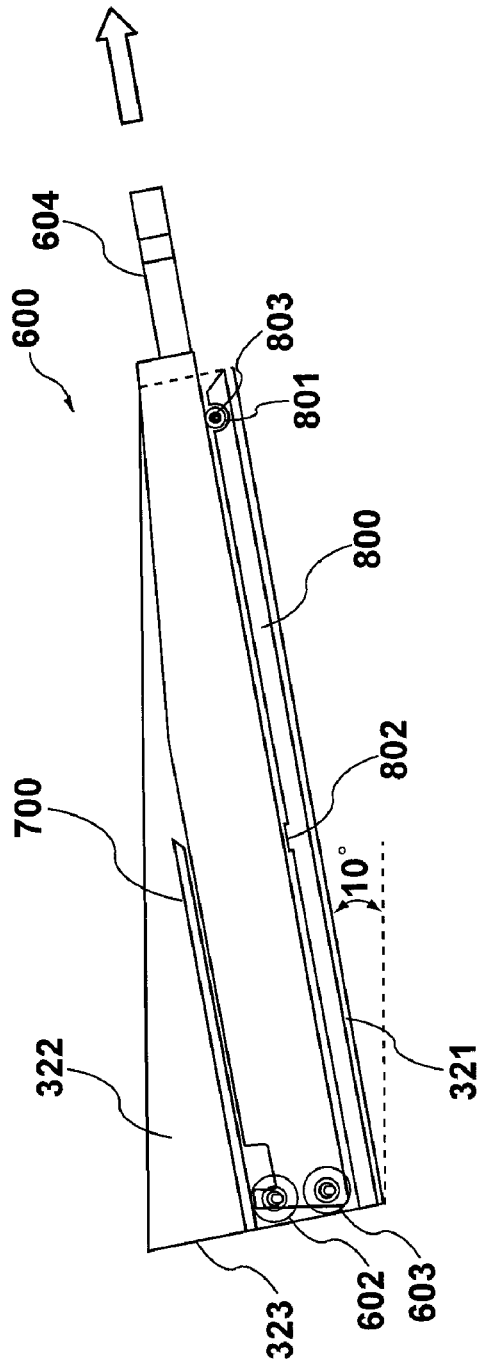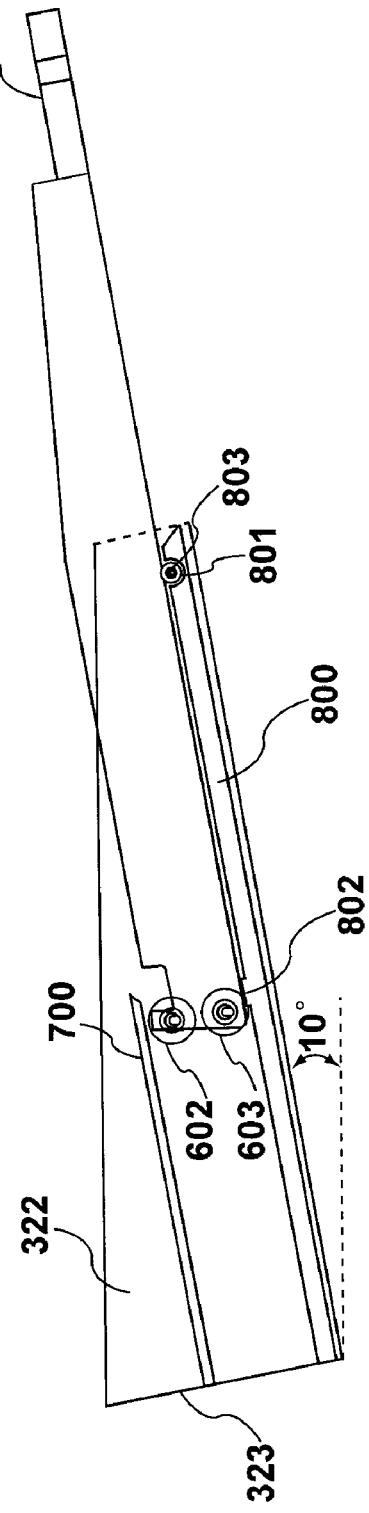

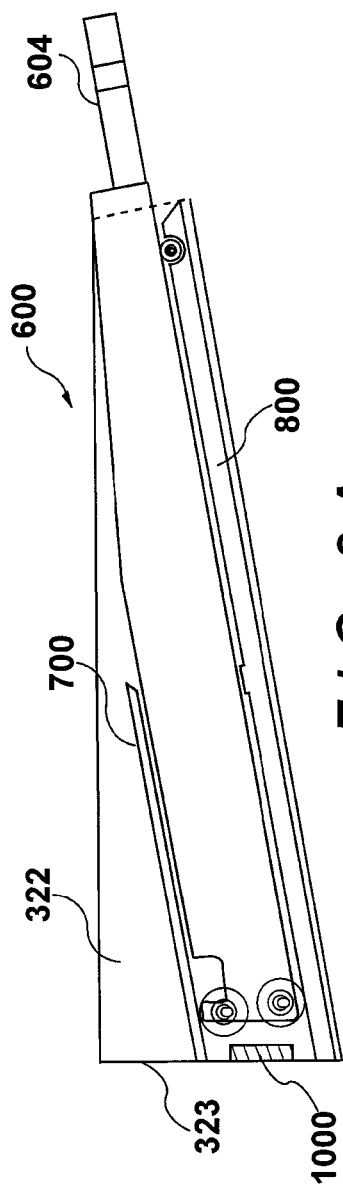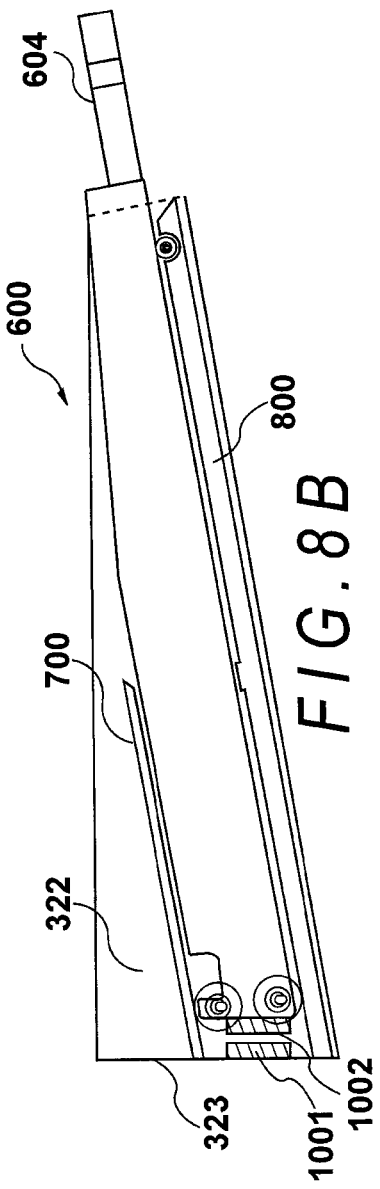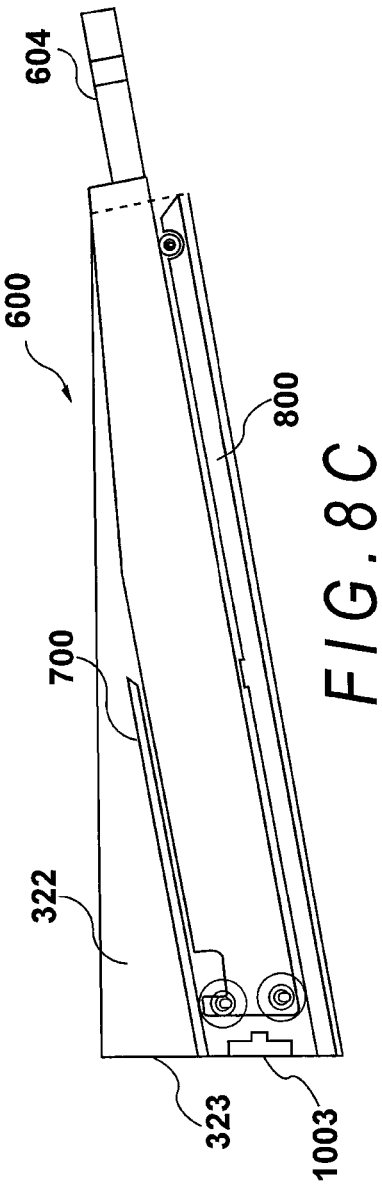

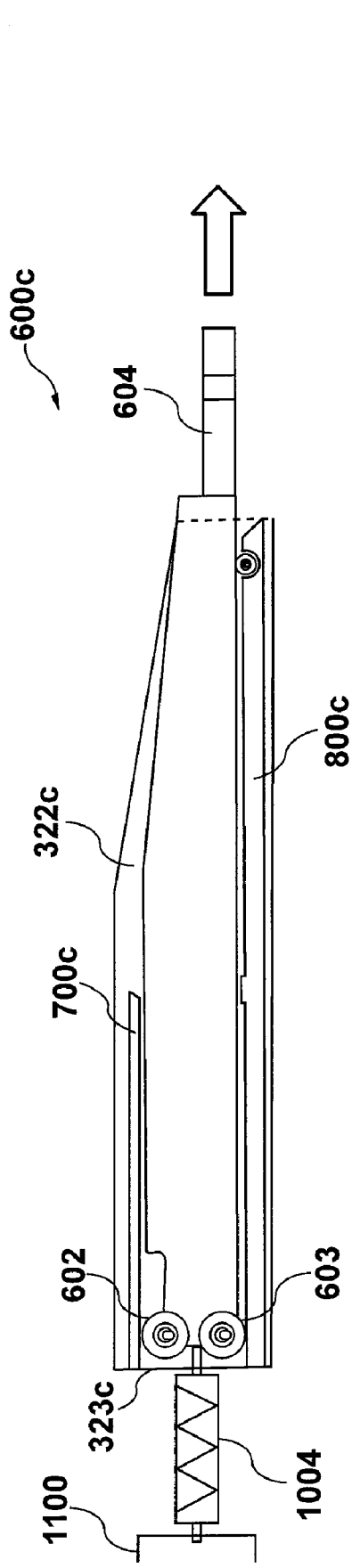
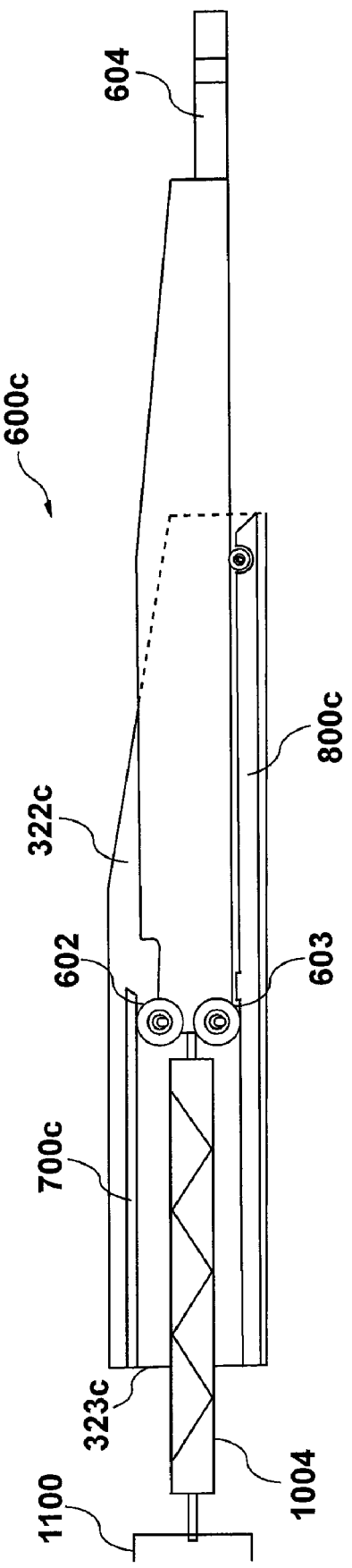

IMAGE FORMING APPARATUS

FIELD OF THE INVENTION

The invention relates to an image forming apparatus that has an image reading section on the upside of a print processing section, especially relates to an image forming apparatus that has a loading plane on the upper surface of a print processing section, for setting a print medium which is ejected from the apparatus body after print process is finished.

BACKGROUND OF THE INVENTION

Conventionally, as this kind of image forming apparatus, for example, disclosed in patent document 1, a Multi Function Products (MFP) is provided, which has at least two of functions of a printer, a copying apparatus, a facsimile apparatus, a scanner and the like. In the above image forming apparatus, after a print medium which is ejected from the apparatus body is set on a loading plane which is formed on the upper surface of a print processing section, a user puts him/her hand into between the print processing section and an image reading section in order to take the print medium out, which is set on the loading plane (refer to patent document 1).

Patent document 1: Japan patent publication No. 2007-096889.

However, it is difficult to take out the print medium printed by the print processing section from the loading plane. Therefore, embodiment of the invention has an objective capable to easily take out the print medium loaded between the print processing section and the image reading section.

SUMMARY OF THE INVENTION

It is, therefore, the invention intends to alleviate the above problem.

An aspect of the invention is to provide an image forming apparatus in which an image reading section is furnished on the upside of a print processing section and an ejection opening is furnished between the image reading section and the print processing section for ejecting a medium that has been printed. The image forming apparatus comprises a loading part that is furnished between the image reading section and the print processing section, and on which the ejected medium is loaded, wherein the loading part includes a body part, a movement member that is movable from the body part, and a guide section that guides the movement member to move from the body part along upward slant direction with respect to a horizontal plane.

Another aspect of the invention is to provide an image forming apparatus in which an image reading section is furnished on the upside of a print processing section and an ejection opening is furnished between the image reading section and the print processing section for ejecting a medium that has been printed. The image forming apparatus comprises a loading part that is furnished between the image reading section and the print processing section, and on which the ejected medium is loaded; and a moving section, wherein the loading part includes a body part and a movement member that is movable from the body part, when the movement member is pulled out to a second position serving as a predetermined pulling-out position from a first position where the movement member is accommodated in the loading part, the moving section makes the movement member move to the first position from the second position.

EFFECT OF THE PRESENT INVENTION

According to embodiment of the invention, it is possible to easily take out the print medium.

The above and other objects and features of the present invention will become apparent from the following detailed description and the appended claims with reference to the accompanying drawings.

BRIEF DESCRIPTION OF THE DRAWINGS

FIG. 4A is a first explanatory diagram of operation for pulling an ejection tray out in an image forming apparatus of embodiment 1;

FIG. 4B is a second explanatory diagram of operation for pulling an ejection tray out in an image forming apparatus of embodiment 1;

FIG. 8A is a diagram (I) for representing main part of other transformation example;

FIG. 8B is a diagram (II) for representing main part of other transformation example;

FIG. 8C is a diagram (III) for representing main part of other transformation example;

FIG. 10A is a first explanatory diagram of operation for pulling an ejection tray out in an image forming apparatus of embodiment 3;

FIG. 10B is a second explanatory diagram of operation for an ejection tray out in an image forming apparatus of embodiment 3;

DETAILED DESCRIPTION OF THE PREFERRED EMBODIMENTS

The following is to explain embodiment of the present invention through using drawings.

[Embodiment 1]

Figure 1B:
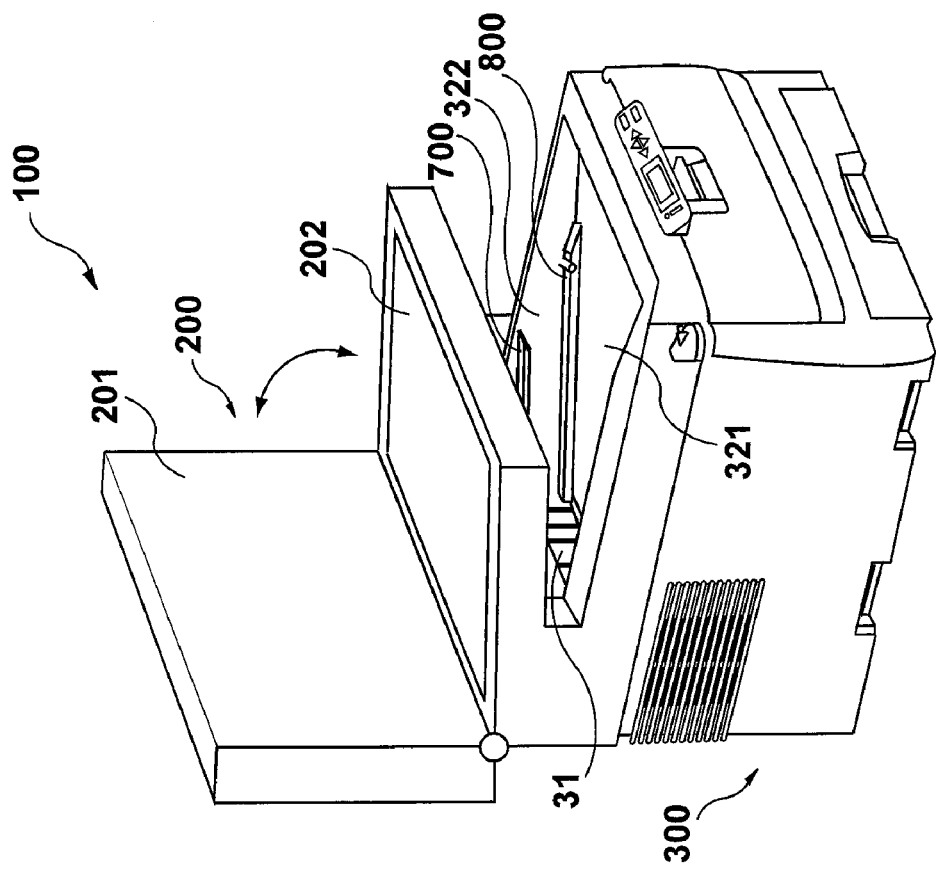
FIG. 1B is an appearance diagram (II) of an image forming apparatus in embodiment 1.
Figure 1A:
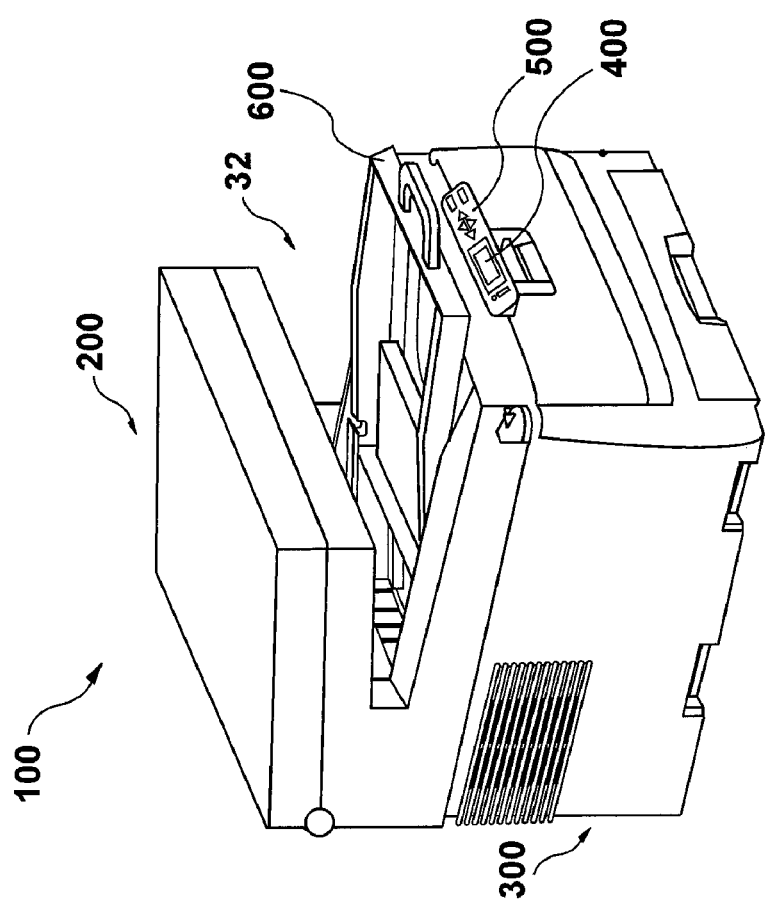
FIG. 1A is an appearance diagram (I) of an image forming apparatus in embodiment 1.

FIG. 1A is an appearance diagram (I) of an image forming apparatus in embodiment 1; and FIG. 1B is an appearance diagram (II) of an image forming apparatus in embodiment 1.

An image forming apparatus 100 in embodiment 1 of the present invention, as shown by FIG. 1A, is a multiplex apparatus having an image reading section (scanner device) 200 that optically reads a manuscript set on a manuscript setting board 202 and generates an image data; and a print processing section (printer) 300 that performs a print process according to the read image data or an image data that is obtained from a higher rank apparatus such as PC (Personal Computer) connected via network and the like.

Moreover, in order to resolve the problem mentioned in the above background of the invention, for example, an image forming apparatus is supplied, which has a structure in which an image reading section can rotatably move upward. In such apparatus, even if a small-sized print medium is set on the loading plane, through rotatably moving the image reading section upward to make it leave from the print processing section, it is possible to easily take the print medium out. However, because the structure of the apparatus becomes complicated, the cost also becomes high.

In consideration of the above-mentioned problem, the present invention supplies an image forming apparatus capable of easily taking the print medium set on the loading plane that is furnished between the print processing section and the image reading section out, and capable of having a low-priced structure, even if an interval between the print processing section and the image reading section cannot be sufficiently secured. Therefore, the present invention adopts the following structure.

The above-mentioned image forming apparatus 100, as shown by FIG. 1A, further includes a display 400 for displaying a message for a user; and operation buttons 500 for receiving setting or instruction from user.

The image reading section 200, as shown by FIG. 1B, has a cover 201 and the manuscript setting board 202 formed from, for example, glass board. When a user upwardly opens the cover 201; sets a manuscript on the manuscript setting board 202; and operates the operation button 500 to instruct "print", the image reading section 200 optically reads the manuscript and generates an image data through a control of a controlling section (not shown). The image reading section 200, as shown by FIG. 2, is extended along slantways.

After the image reading section 200 generated an image data, the image data is stored into an image memory (not shown) of the image forming apparatus 100 through a control of the above-mentioned controlling section.

Figure 2:
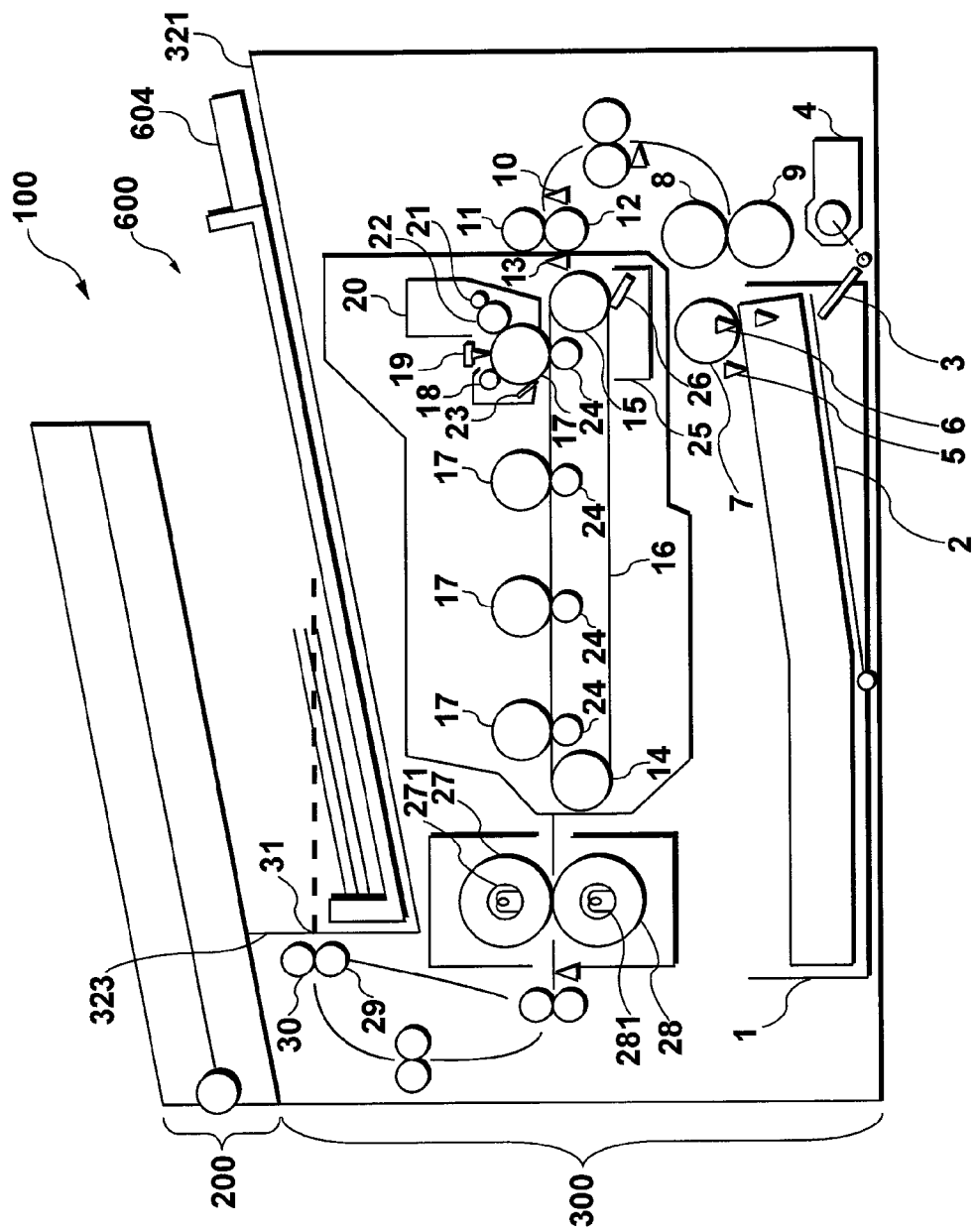
FIG. 2 is a diagram for showing a structure of an image forming apparatus in embodiment 1.

FIG. 2 is a diagram for showing a structure of an image forming apparatus in embodiment 1.

The print processing section 300, as shown by FIG. 2, is formed from a paper tray 1, a paper setting board 2, a lift-up lever 3, a lift-up lever driving motor 4, a paper existence/inexistence detecting section 5, a rise detecting section 6, a pick-up roller 7, a feeding roller 8, a retarding roller 9, a paper sensor 10, a conveying roller 11, a pressing roller 12, a writing-out sensor 13, a driving roller 14, a tension roller 15, an endless belt 16, a photosensitive drum 17, a charging roller 18, a LED head 19, a toner tank 20, a supplying roller 21, a developing roller 22, a cleaning blade 23, a transferring roller 24, a belt remainder toner collecting box 25, a belt use cleaning blade 26, a upper roller 27, a lower roller 28, an ejecting roller 29, a pressing roller 30 and an ejection opening 31.

In the embodiment 1, the print processing section 300 has four photosensitive drums 17 for forming toner images of four colors. In the embodiment 1, it is explained regarding a formation of toner image on a photosensitive drum furnished on the most upstream, however, the four photosensitive drums 17 shown by FIG. 2 respectively performs the same process. Moreover, in FIG. 2, the developing roller 22, the supplying roller 21, the charging roller 18, the LED head 19, the cleaning blade 23 and the toner tank 20 that are furnished around other three photosensitive drums 17, are omitted to be shown.

The paper tray 1 is used for stacking and holding paper; inside the paper tray 1, the paper setting board 2 is provided; the paper setting board 2 is used to stack and load the paper. The paper setting board 2, as shown by FIG. 2, is supported by and is contacted with the lift-up lever 3 on underside. Further, the paper setting board 2 is used for making the front edge of the paper loaded in the paper tray 1 move to a conveyance path (mentioned below) through lifting upwardly the paper setting board 2 by a upward movement which is an operation (mentioned below) of the lift-up lever 3.

On the one hand, when the paper tray 1 is attached to the body of the image forming apparatus 100, the controlling section detects that the paper tray has been attached to the image forming apparatus 100 through a tray sensor (not shown) and instructs a motor controlling section (not shown) to drive the lift-up lever driving motor 4 so as to make the lift-up lever 3 move upwardly.

On the other hand, when the paper tray 1 is removed from the body of the image forming apparatus 100, the controlling section detects that the paper tray has been removed from the image forming apparatus 100 through the tray sensor and instructs the motor controlling section to drive the lift-up lever driving motor 4 so as to make the lift-up lever 3 move downwardly.

The paper existence/inexistence detecting section 5 is a sensor that detects whether or not a paper is loaded on the paper setting board 2 in the paper tray 1. Further, the paper existence/inexistence detecting section 5 is formed from, for example, a light emitting element such as LED or the like and a light receiving element. When a power source is turned on, the paper existence/inexistence detecting section 5 is started up, the light emitting element starts to turn on a light in pulse. Then, the light emitting element emits light to paper and the light-receiving element receives a reflection light from the paper. By this, the paper existence/inexistence detecting section 5 detects existence/inexistence of paper.

That is, on the one hand, if a pulse number of the reflection light that is received by the light receiving element is bigger than a predetermined value, the paper existence/inexistence detecting section 5 generates paper existence signal and sends the signal to the controlling section.

On the other hand, if the pulse number of the reflection light that is received by the light receiving element is the predetermined value or below, the paper existence/inexistence detecting section 5 generates paper inexistence signal and sends the signal to the controlling section.

When the controlling section receives the paper inexistence signal, the controlling section makes a program start up, that is previously set in a memory (not shown) of the image forming apparatus 100; and makes the display 400 display a notification scene notifying of paper inexistence in the paper tray 1. By this, the user refers to the notification scene displayed on the display 400, pulls the paper tray 1 out from the body of the image forming apparatus 100, and feeds paper.

Moreover, in the image forming apparatus 100 of embodiment 1 in the present invention, it may adopt a structure in which not only the paper existence/inexistence detecting section 5 is furnished, but also a paper remainder detecting section is furnished to detect whether or not paper loaded on the paper setting board 2 in the paper tray 1 is a predetermined amount (sheet number) or over. Thereby, before paper in the paper tray 1 runs out, the paper remainder detecting section detects a shortage of paper and notifies of the shortage of paper through using the display 400.

The rise detecting section 6 is a detecting section for detecting that the most upper paper loaded on the paper setting board 2 in the paper tray 1 rises to a height of a conveyance path; and is furnished at the height of the conveyance path. That is, the rise detecting section 6, when detects the most upper paper loaded on the paper setting board 2 in the paper tray 1, generates rise detection signal and sends the signal to the controlling section.

The controlling section, after received the rise detection signal, stops supplying the lift-up lever driving motor 4 with voltage outputted from the power source section via a motor controlling section (not shown). By this, upward movement of the lift-up lever 3 is stopped, therefore, the most upper paper on the paper setting board 2 in the paper tray 1 is located to correspond to the height of the conveyance path.

Then, after the controlling section makes the most upper paper on the paper setting board 2 in the paper tray 1 locate to correspond to the height of the conveyance path, the controlling section shifts to a job waiting state.

After the image forming apparatus 100 obtained an instruction of "print" and an image data from the higher rank apparatus which is connected with the image forming apparatus 100 via network through an I/F (Inter/Face) section (not shown), the image data is stored into the image memory (not shown) by the control of the controlling section (not shown) of the image forming apparatus 100. Here, the I/F section is a communicating section to perform a receiving of the image data from the higher rank apparatus and to perform a notification regarding process result of the received image data; is a serial interface such as USB (Universal Serial Bus) or a parallel interface such as IEEE1284 and the like; and is connected with the higher rank apparatus in a predetermined protocol of each interface.

After the image data based on the instruction of "print" is stored into the image memory, in the case that the paper existence signal is received from the paper existence/inexistence detecting section 5, the controlling section supplies a pick-up roller drive motor (not shown) of the image forming apparatus 100 with voltage outputted from the power source section via the motor controlling section so as to rotate the motor for making the pick-up roller 7 rotate.

The pick-up roller 7 is a roller for feeding the most upper paper loaded on the paper setting board 2 in the paper tray 1. That is, when the pick-up roller 7 is rotated by a drive of the pick-up roller drive motor, the pick-up roller 7 conveys the paper to feed.

When the pick-up roller 7 conveys the paper, the controlling section supplies a feeding roller drive motor (not shown) and a retarding roller drive motor (not shown) of the image forming apparatus 100 with voltage outputted from the power source section via the motor controlling section so as to rotate these motors for making the feeding roller 8 and the retarding roller 9 rotate.

If papers conveyed by the pick-up roller 7 are overlapping, the feeding roller 8 and the retarding roller 9 are rollers used for making the paper separate one by one. That is, when the feeding roller 8 and the retarding roller 9 are rotated by a drive of the feeding roller drive motor and the retarding roller drive motor, because the feeding roller 8 rotates along a direction to push out the paper to the conveyance path; and the retarding roller 9 which is furnished opposite to the feeding roller 8 rotates along a direction to return the paper, for example, in the case that papers are conveyed in a overlapping state, only the upside paper is conveyed along the conveyance path.

The paper sensor 10 is a sensor for detecting a paper to be conveyed; in the case that the paper sensor 10 detects the front edge of the paper, generates paper detection signal and send the signal to the controlling section.

When the controlling section receives the paper detection signal, supplies a conveying roller drive motor with voltage outputted from the power source section via the motor controlling section so as to rotate the motor for making the conveying roller 11 rotate.

The conveying roller 11 is a roller for conveying paper. That is, when the conveying roller 11 is rotated by a drive of the conveying roller drive motor, the conveying roller 11 conveys paper through using the pressing roller 12 that is furnished opposite to the conveying roller 11.

In order to form a toner image (mentioned below) that is formed on the photosensitive drum 17 on a paper, the writing-out sensor 13 is a sensor used for matching a start position of the toner image on the photosensitive drum 17 with a writing-out start position of the toner image on the paper. In the case that the writing-out sensor 13 detects the front edge of the paper conveyed by the conveying roller 11, generates writing-out detection signal and send the writing-out detection signal to the controlling section.

After the controlling section receives the writing-out detection signal, makes the conveying roller 11 stop rotating via the motor controlling section. Therefore, the paper is stopped by the control of the controlling section so as to make the front edge set to be a writing-out position in a state that it is being sandwiched with the conveying roller 11 and the pressing roller 12.

When the conveying roller 11 stopped, the controlling section supplies a driving roller drive motor and a drum motor with voltage outputted from the power source section via the motor controlling section so as to rotate these motors. Moreover, the driving roller drive motor is for making the driving roller 14 rotate; and the drum motor is for making the photosensitive drum 17 rotate.

The driving roller 14 is a roller for making the endless belt 16 move, which is extended by the driving roller 14 and the tension roller 15. That is, in the case that the driving roller 14 is rotated by a drive of the driving roller drive motor, the endless belt 16 is extended by the driving roller 14 and the tension roller 15 and moves.

The photosensitive drum 17 is an OPC (Organic Photo Conductor) drum used for carrying a toner image. When the photosensitive drum 17 is rotated by a drive of the drum motor, the charging roller 18 charges the surface of the photosensitive drum 17 by the control of the controlling section.

After the surface of the photosensitive drum is charged, the LED head 19 that is formed by, for example, arraying LEDs (Light Emitting Diode) emits light by the control of the controlling section; and forms an electrostatic latent image on the surface of the charged photosensitive drum 17 on the basis of the image data that is held by the image memory. Here, the electrostatic latent image on the surface of the photosensitive drum 17 is formed according to a position of the front edge of the print medium by the control of the controlling section.

After the electrostatic latent image is formed on the surface of the photosensitive drum 17, through using a toner that is held in the toner tank 20 and through the control of the controlling section, the electrostatic latent image on the photosensitive drum 17 is developed via the supplying roller 21 and the developing roller 22. By this, the toner image corresponding to the electrostatic latent image is formed as a visible image on the surface of the photosensitive drum 17.

After the toner image is formed on the photosensitive drum 17, the controlling section supplies the conveying roller drive motor with voltage outputted from the power source section via the motor controlling section; and makes the conveying roller drive motor drive. By this, the paper that is stopped in a state that it is being sandwiched with the conveying roller 11 and the pressing roller 12, is conveyed to the endless belt 16 by a rotate of the conveying roller 11.

By the control of the controlling section, the paper on the endless belt 16 is conveyed while being sandwiched by the photosensitive drum 17 and the transferring roller 24, the toner image on the surface of the photosensitive drum 17 is transferred on the paper by the transferring roller 24. Here, high voltage outputted from the power source section is provided to the transferring roller 24 as a transfer voltage by a control of the controlling section.

After the toner image on the surface of the photosensitive drum 17 is transferred on the paper, the controlling section supplies an upper roller drive motor with voltage outputted from the power source section via the motor controlling section so as to rotate the motor for making the upper roller 27 rotate.

On the one hand, after the toner image on the surface of the photosensitive drum 17 is transferred on the paper, a remained toner (remainder toner) on the surface of the photosensitive drum 17 is scraped and removed by the cleaning blade 23. Then, the scraped remainder toner is collected by a remainder toner collecting section (not shown) of the image forming apparatus 100.

On the other hand, after the toner image on the surface of the photosensitive drum 17 is transferred on the paper that is conveyed on the endless belt 16, a toner (remainder toner) adhered to the surface of the endless belt 16 is scraped and removed by the belt use cleaning blade 26. Then, the scraped remainder toner is collected by a remainder toner collecting box 25.

The upper roller 27 and the lower roller 28 are rollers for heating and pressing a toner image on a paper to fix it on the paper. When the toner image on the surface of the photosensitive drum 17 is transferred on the paper, through the control of the controlling section, the surfaces of the upper roller 27 and the lower roller 28 are heated at a predetermined temperature by a heater 271 furnished in the upper roller 27 and a heater 281 furnished in the lower roller 28.

Further, the upper roller 27 is rotated by a drive of the upper roller drive motor and conveys a paper through using the lower roller which is furnished opposite to the upper roller 27. By this, the toner image on the paper that is conveyed while being sandwiched by the upper roller 27 which is heated at the predetermined temperature and the lower roller 28 which is furnished opposite to the upper roller 27, is heated and pressed by the upper roller 27 and the lower roller 28, then, is fixed on the paper.

After the toner image on the paper is fixed on the paper, the controlling section supplies an ejecting roller drive motor with voltage outputted from the power source section via the motor controlling section so as to rotate the motor for making the ejecting roller 29 rotate.

The ejecting roller 29 is a roller for ejecting paper from the ejection opening 31. The paper that is performed a fixing process by the upper roller 27 and the lower roller 28, is conveyed while being sandwiched by the ejecting roller 29 that is rotating and the pressing roller 30 which is furnished opposite to the ejecting roller 29, and is ejected from the ejection opening 31.

The image forming apparatus 100, in addition to the above-mentioned structure, as shown by FIG. 1A, a loading part 32 is formed on the upper surface of the print processing section 300, the loading part 32 is used for loading the paper ejected from the ejection opening 31. The loading part 32 is formed from an ejection tray 600 for loading and holding the paper that has been performed a print process and is ejected from the ejection opening 31, as shown by FIG. 1A; an upside guide 700 and an underside guide 800 that are guides for removably attaching the ejection tray 600 to the apparatus body, a loading plane 321 for placing the ejection tray 600, a side wall 322 for furnishing the upside guide 700 and the underside guide 800 as shown by FIG. 1B; and a back wall 323 on which the ejection opening 31 is furnished, as shown by FIG. 2.

In the present embodiment, the ejection tray 600 will be explained below as an independent composition, but the ejection tray 600 is a part of the loading part 32. Further, in the present embodiment, the upside guide 700 and the underside guide 800 will be explained below as an independent composition, but the upside guide 700 and the underside guide 800 are a part of the loading part 32. Furthermore, in the present embodiment, the loading part 32 is explained as that having the above-mentioned structure, however, it may adopt a structure at least having the loading plane 321, the ejection tray 600, the upside guide 700 and the underside guide 800.

On the upper surface of the print processing section 300, as shown by FIG. 1B, the loading plane 321, the side wall 322 and the back wall 323 are furnished, therefore, an ejection space is formed by these wall surfaces.

FIG. 4A is a first explanatory diagram of operation for pulling an ejection tray out in an image forming apparatus of embodiment 1; and FIG. 4B is a second explanatory diagram of operation for pulling an ejection tray out in an image forming apparatus of embodiment 1.

In the present embodiment, the loading plane 321, as shown by FIG. 4A, has an inclination angle of 10 degrees with respect to a horizontal plane. The loading plane 321 having such inclination angle has an advantage capable of obtaining a bigger ejection space by comparing with a horizontal loading plane.

On the side wall 322, as shown by FIG. 4A, the upside guide 700 and the underside guide 800 are attached at the same inclination angle of 10 degrees as the loading plane 321. The ejection tray 600 is drawably attached through an upside roller 602 and an underside roller 603 are rotatably coupled with the upside guide 700 and the underside guide 800.

The underside guide 800, as shown by FIG. 4A and FIG. 4B, has a roller 801 and a projection 802. The roller 801 is for drawably rotating and holding the ejection tray 600; and the projection 802 contacts with the underside roller 603 of the ejection tray 600 in order to prevent the ejection tray 600 from coming off from the upside guide 700 and the underside guide 800 when the ejection tray 600 is drawn out. The roller 801 of the underside guide 800 is attached on the front end side of the underside guide 800 by a stop ring 803.

Figure 3:
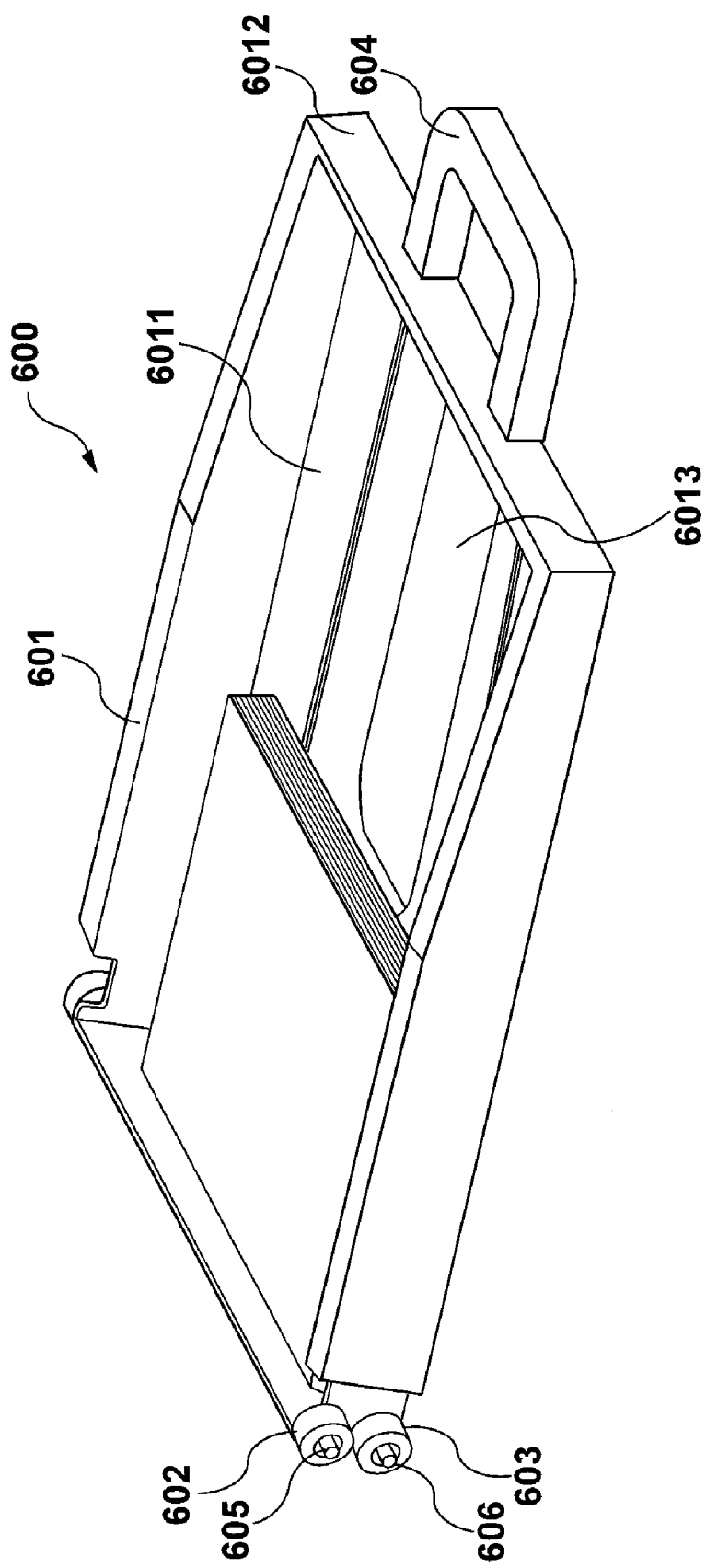
FIG. 3 is a diagram for showing a structure of an ejection tray in an image forming apparatus of embodiment 1.

FIG. 3 is a diagram for showing a structure of an ejection tray in an image forming apparatus of embodiment 1.

The ejection tray 600, as shown by FIG. 3, a tray part 601 for loading and holding paper, the upside roller 602 and the underside roller 603 that are rotatably attached on the back end of the tray part 601, a handle 604 which is used when pulling out the ejection tray 600. The upside roller 602 and the underside roller 603 are rotatably attached by a stop ring 605 and a stop ring 606.

The tray part 601 is formed by a bottom part 6011 for loading paper; a rectangle-shaped wall part 6012 for holding the paper to be loaded; and a cavity part 6013 that is formed on the center of front side of the bottom part 6011 so as to easily take out the paper that is loaded and held in the tray part 601.

The upside roller 602 and the underside roller 603 are respectively furnished at the both sides of the back end of the wall part 6012 in the tray part 601, and respectively placed on upside and underside.

Further, as shown by FIG. 4A, the upside roller 602 and the underside roller 603 are rotatably coupled with the upside guide 700 and the underside guide 800.

The ejection tray 600 having the above structure bumps against the back wall 323, and stops through making the upside roller 602 and the underside roller 603 couple with the upside guide 700 and the underside guide 800; and through pushing the upside roller 602 and the underside roller 603 toward the ejection opening 31 in a state that the bottom part 6011 is contacted with the roller 801 of the underside guide 800. By this, the ejection tray 600 is located in a position that the paper ejected from the ejection opening 31 is able to be loaded.

Accordingly, in the ejection tray 600, the paper that has been performed a print process and is ejected from the ejection opening 31, is loaded and held.

When the user takes out the paper that is loaded in the ejection tray 600, the user holds the handle 604 of the ejection tray 600 and pulls out the ejection tray 600 along upward slant direction.

Then, as shown by FIG. 4B, the user pulls out the ejection tray 600 till the underside roller 603 of the ejection tray 600 contacts with the projection 802 of the underside guide 800. By this, it becomes possible to take out the paper while preventing the upside roller 602 and the underside roller 603 of the ejection tray 600 from coming off from the upside guide 700 and the underside guide 800.

That is, the user, while holding the handle 604 of the ejection tray 600, takes out the paper that is loaded in the tray part 601 through inserting his/her hand into the cavity part 6013. After that, when the user takes his/her hand off the handle 604, because of weight of the ejection tray 600, the ejection tray 600 moves till the ejection tray 600 bumps against the back wall 323 while being guided by the upside guide 700 and the underside guide 800. By this, the ejection tray 600 is placed in a position that the paper ejected from the ejection opening 31 is able to be automatically loaded.

Figure 5:
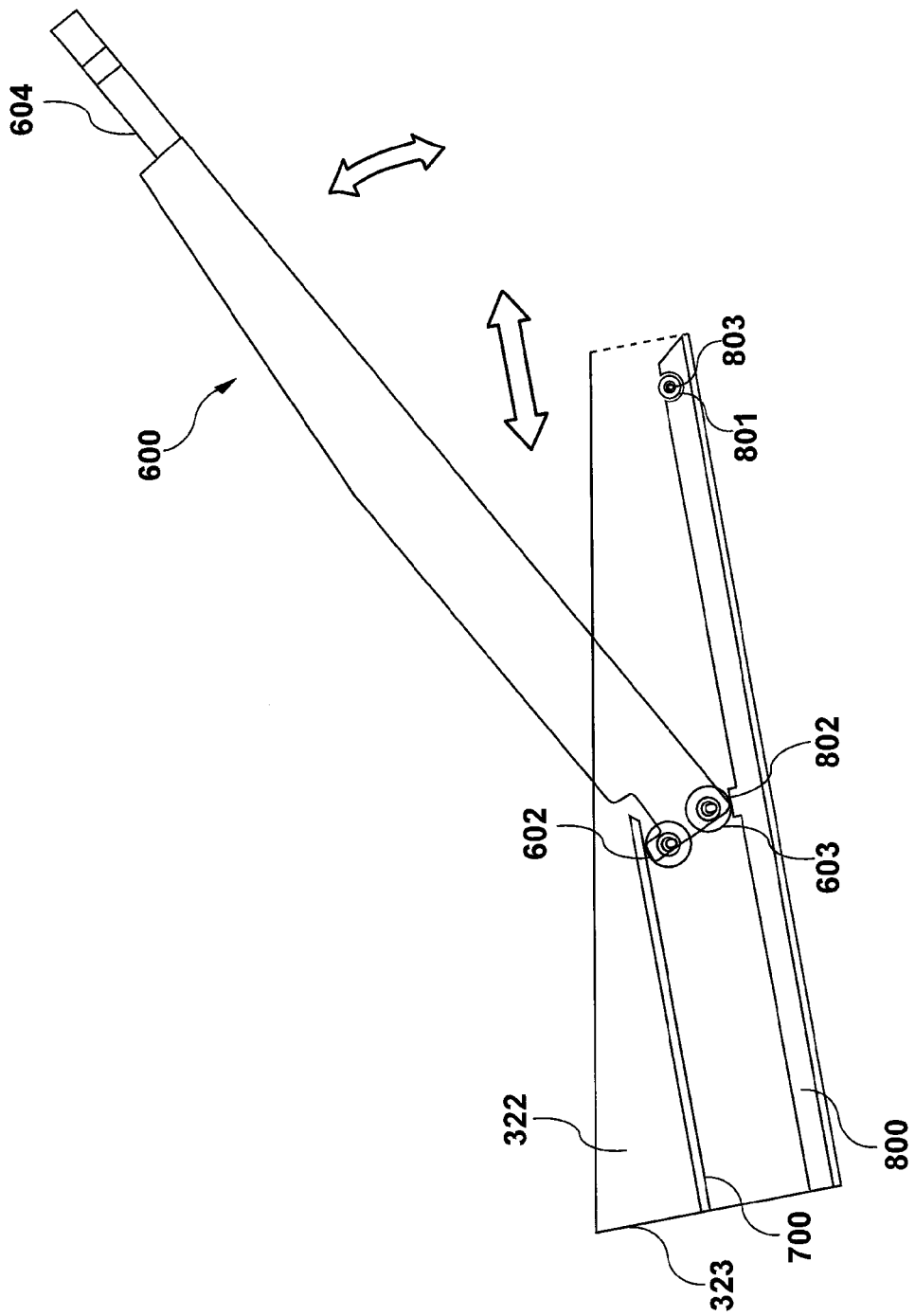
FIG. 5 is an explanatory diagram of operation for removing an ejection tray in an image forming apparatus of embodiment 1.

FIG. 5 is an explanatory diagram of operation for removing an ejection tray in an image forming apparatus of embodiment 1.

In the case to take out the ejection tray 600 from the upside guide 700 and the underside guide 800, as shown by FIG. 5, firstly, the user holds the handle 604 to pull out the ejection tray 600 in order that the underside roller 603 of the ejection tray 600 contacts with the projection 802 of the underside guide 800, by this, the underside roller 603 of the ejection tray 600 is contacted with the projection 802 of the underside guide 800.

Next, after the ejection tray 600 is rotated along upward slant direction and the underside roller 603 is climbed over the projection 802, the user pulls out the ejection tray 600. By this, the loading plane 321 is exposed, therefore, it is possible to load big-sized paper on the loading plane 321, that is ejected from the ejection opening 31 without using the ejection tray 600.

In the image forming apparatus 100 of embodiment 1 of the present invention, the inclination angle of the loading plane 321 and the inclination angle of the upside guide 700 and the underside guide 800 furnished on the side wall 322, are all set into 10 degrees, it is desirable that the inclination angle is set within 5~30 degrees. As a reason, in the case that the inclination angle is too big, that is, in the case that the inclination angle exceeds 30 degrees, as shown by FIG. 2, the one end of the image reading section 200 having a big inclination angle is located upwardly, therefore, the body of the image forming apparatus 100 becomes large. In the case that the inclination angle is too small, that is, in the case that the inclination angle is below 5 degrees, the upside roller 602 and the underside roller 603 of the ejection tray 600 does not rotated because of weight of the ejection tray 600, therefore, the ejection tray 600 does not make the upside guide 700 and the underside guide 800 move automatically along downward slant direction.

<Effect of Embodiment 1>

According to the image forming apparatus 100 of embodiment 1 in the present invention, even if the interval (ejection space) between the image reading section 200 and the print processing section 300 is narrow, the ejection tray 600 is drawably attached, and the paper that has been performed a print process and is ejected from the ejection opening 31, is loaded in the ejection tray 600, therefore, even if paper to be used in the print process is small, the user can take out the paper without bother through pulling out the ejection tray 600 by holding the handle 604.

Further, according to the above image forming apparatus 100, because the loading plane 321, and the upside guide 700 and the underside guide 800 that are furnished on the side wall 322 have the inclination angle with respect to the horizontal plane, after the user holds the handle 604 to pull out the ejection tray 600 and takes out the paper, when the user takes the handle 604 off, the ejection tray 600 moves till the ejection tray 600 bumps against the back wall 323 while being guided by the upside guide 700 and the underside guide 800 because of weight of the ejection tray 600. Therefore, it is possible to move to a position that the paper ejected from the ejection opening 31 is able to be loaded.

[Embodiment 2]

Figure 13:
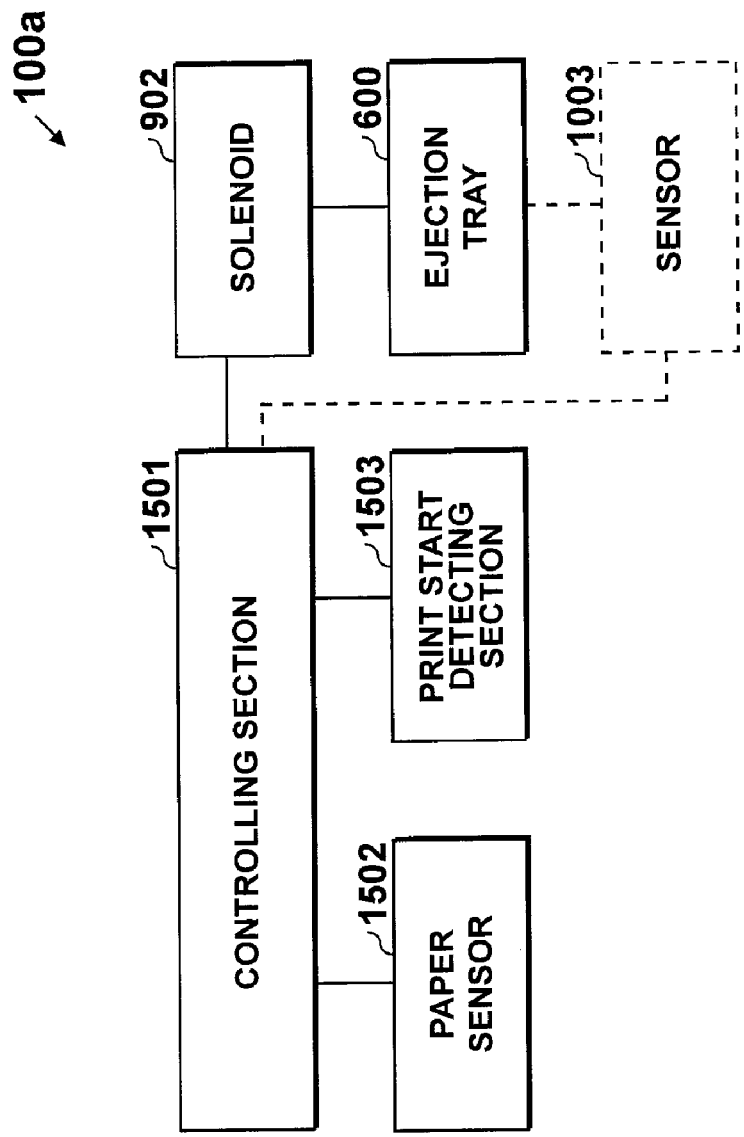
FIG. 13 is a function diagram of an image forming apparatus of embodiment 2.

FIG. 13 is a function diagram of an image forming apparatus of embodiment 2.

Figure 6:
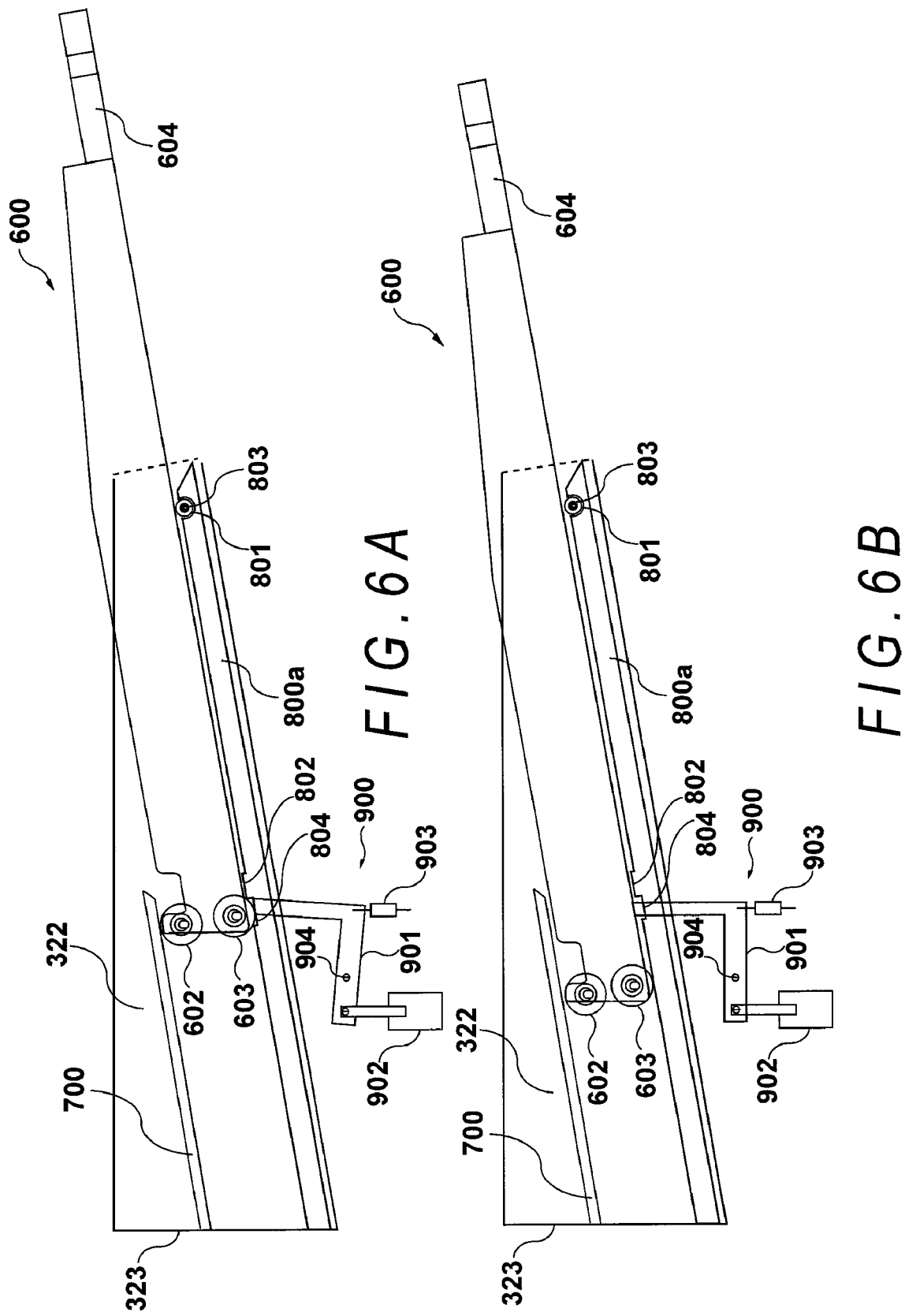
FIG. 6A is a first explanatory diagram of operation for pulling an ejection tray out in an image forming apparatus of embodiment 2.
FIG. 6B is a second explanatory diagram of operation for pulling an ejection tray out in an image forming apparatus of embodiment 2.

FIG. 6A is a first explanatory diagram of operation for pulling an ejection tray out in an image forming apparatus of embodiment 2; and FIG. 6B is a second explanatory diagram of operation for pulling an ejection tray out in an image forming apparatus of embodiment 2.

In an image forming apparatus 100a of embodiment 2 of the present invention, in order that the user can take out the paper loaded in the ejection tray 600 in a state that the ejection tray 600 is fixed in a predetermined pulling-out position, as shown by FIG. 6A, a structure is adopted to use an underside guide 800a on which a concavity 804 is formed for making the ejection tray 600 stop in the predetermined pulling-out position through making the underside roller 603 of the pulled ejection tray 600 fit into the concavity 804.

Further, in the embodiment, as shown by FIG. 6A, a structure is adopted which has a roller lift-up mechanism 900 for lifting the underside roller 603 of the concavity 804 to take off the underside roller 603 from the concavity 804 and a controlling section 1501 for controlling the roller lift-up mechanism 900.

The roller lift-up mechanism 900, as shown by FIG. 6A, is formed by a L-type link member 901; a solenoid 902 that is coupled with the back end of the link member 901 in order to make the link member 901 rotate around a support axle 904; and a spring 903 for providing retreat force to the link member 901. The spring 903 is connected with frame (not shown).

In the roller lift-up mechanism 900 having the above structure, because the solenoid 902 is not turned on the electricity except when a takeout of the paper loaded in the ejection tray 600 is finished or when new image data is obtained, the link member 901 receives elastic force of the spring 903 and rotates clockwise so as to retreat. In the retreat state, the front end of the link member 901 does not project to a penetration hole formed on the concavity 804. Accordingly, in the case that the ejection tray 600 is pulled out to the predetermined position, the underside roller 603 fits into the concavity 804, therefore, the ejection tray 600 is automatically held in the predetermined position and it becomes possible to take out the paper.

After the paper is taken out from the ejection tray 600, a paper sensor 1502 furnished on the loading plane 321 or on the back wall 323 outputs detection signal representing paper inexistence, so the controlling section 1501 receives the detection signal and controls the solenoid 902 to turn on the electricity. By this, as shown by FIG. 6B, the link member 901 rotates counterclockwise, so its front end upwardly projects from the penetration hole of the concavity 804 and lifts up the underside roller 603 in the concavity 804. Therefore, because of the weight of the ejection tray 600, the ejection tray 600 moves backwardly via the upside guide 700 and the underside guide 800a; and is set in the loading position of the paper. Moreover, the solenoid 902 is controlled to turn on the electricity only for a short time.

Moreover, in the above embodiment, in the case that the ejection tray 600 is held in a pulling-out state, when image data is obtained from the upper apparatus connected with network or from the image reading section and the controlling section 1501 is notified that a print start detecting section 1503 has been detected a print start, it is possible to adopt to make the roller lift-up mechanism 900 operate in order that the ejection tray 600 returns to the original position through turning the solenoid 902 on the electricity by the controlling section 1501.

The other components are the same as those of the image forming apparatus 100 of embodiment 1.

<Effect of Embodiment 2>

According to embodiment 2 of the present invention, because the upside guide 700 and the underside guide 800a on which the concavity 804 having the penetration hole is formed, are attached on the side wall 322; and the underside roller 603 of the pulled ejection tray 600 is fit into the concavity 804, it is possible to make the ejection tray 600 stop at the predetermined pulling-out position without holding the handle 604, and it is possible to take out easily the paper that is loaded on the ejection tray 600.

Further, according to the image forming apparatus, in the structure, the roller lift-up mechanism 900 is furnished and the controlling section 1501 controls the solenoid 902 of the roller lift-up mechanism 900 to turn on the electricity. Therefore, when the paper is taken out from the ejection tray 600 or when new image data is obtained, through controlling the solenoid 902 to turn on the electricity by the controlling section 1501, the front end of the link member 901 projects upwardly from the penetration hole of the concavity 804 of the underside guide 800 and lifts up the underside roller 603 in the concavity 804. Therefore, because of the weight of the ejection tray 600, it is possible to make the ejection tray 600 move backwardly via the upside guide 700 and the underside guide 800a and to make the ejection tray 600 automatically place in the loading position of the paper.

<Transformation Example>

Figure 7:
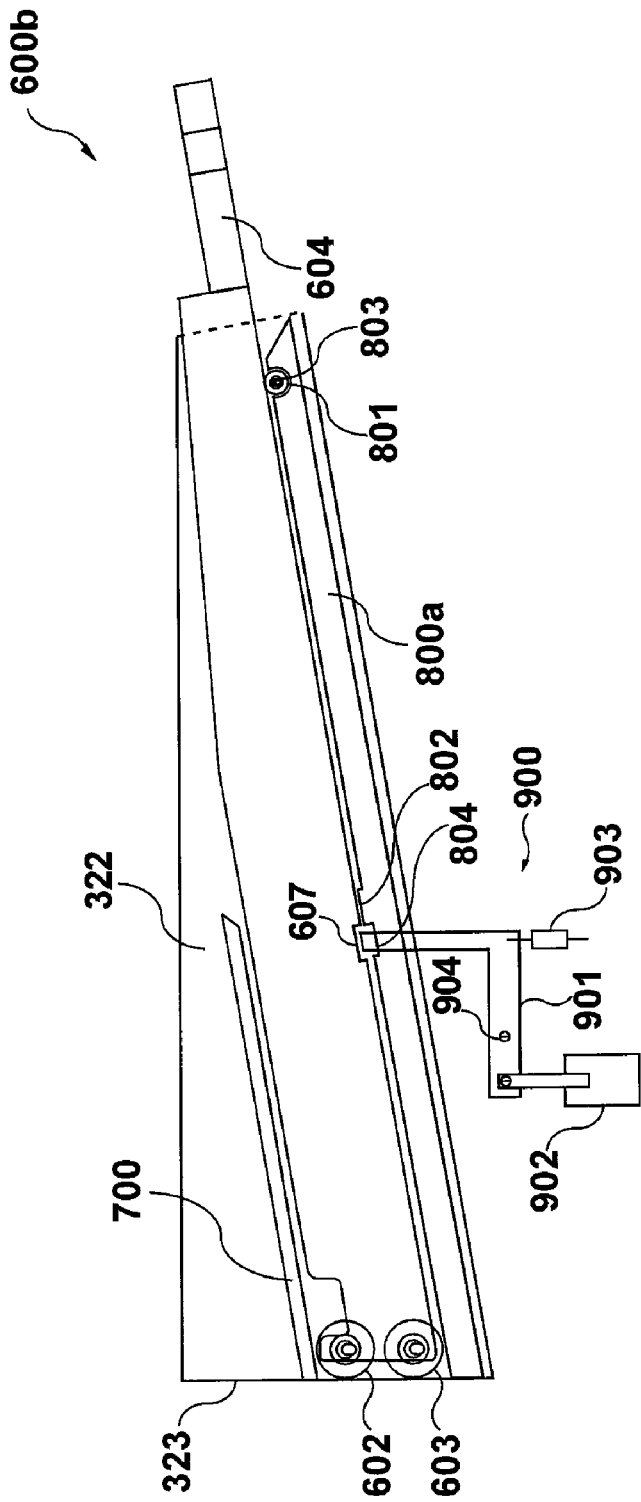
FIG. 7 is a diagram for representing main part of transformation example.

FIG. 7 is a diagram for representing main part of transformation example.

As a transformation example of embodiment 2 of the present invention, in order to load certainly the ejected paper on the ejection tray, as shown by FIG. 7, it may adopt the structure to use an ejection tray 600b on which a concavity 607 is furnished for preventing the ejection tray 600b from pulling to couple with the link member 901.

That is, on the center of the bottom of the ejection tray 600b, the concavity 607 is furnished. And, in the case that image data is obtained or in other case, after the controlling section 1501 detects that the ejection tray 600b bumps against the back wall 323, through using the sensor (not shown), the controlling section 1501 controls the solenoid 902 to turn on the electricity. By this, as shown by FIG. 7, because the retreated link member 901 rotates counterclockwise, its front end couples with the concavity 607 of the ejection tray 600b. Accordingly, it becomes impossible to pull out the ejection tray 600b when printing.

After the controlling section 1501 detects that the print process is finished, controls the solenoid 902 to turn off the electricity; and takes the front end of the link member 901 off from the concavity 607.

By this, it becomes possible to pull out the ejection tray 600b, so, the paper can be taken out.

<Other Transformation Example>

FIG. 8A is a diagram (I) for representing main part of other transformation example; FIG. 8B is a diagram (II) for representing main part of other transformation example; and FIG. 8C is a diagram (III) for representing main part of other transformation example.

As a transformation of embodiment 1 and embodiment 2 of the present invention, as shown by FIG. 8, in order to reduce the impact when the back surface of the ejection tray 600 collides with the back wall 323, it may adopt the structure to furnish a buffer member 1000 on the back wall 323.

Further, as shown by FIG. 8B, in order to slide smoothly along downward slant direction in the upside guide 700 and the underside guide 800 of the ejection tray 600, it may adopt the structure to furnish a magnet 1001 on the back wall 323; and to furnish a magnet 1002 on the back surface of the ejection tray 600 that is opposite to the back wall 323. By the structure, through magnetic force caused through the magnet 1001 and the magnet 1002 pull mutually, it is possible to slide the ejection tray 600 smoothly by compared with a structure in which magnet is not be used.

Furthermore, as shown by FIG. 8C, in order that the ejection tray 600 certainly stacks the ejected paper, it may adopt the structure to furnish a sensor 1003 (refer to FIG. 13) on the back wall 323, which detects that the back surface of the ejection tray 600 contacts with the back wall 323. By the structure, in the case that the back surface of the ejection tray 600 contacts with the back wall 323, the controlling section 1501 controls to eject the paper, further, in the case that the ejection tray is not placed a predetermined position, because the display 400 displays a message representing such state, it is possible to stack certainly the ejected paper on the ejection tray 600.

[Embodiment 3]

Figure 9:
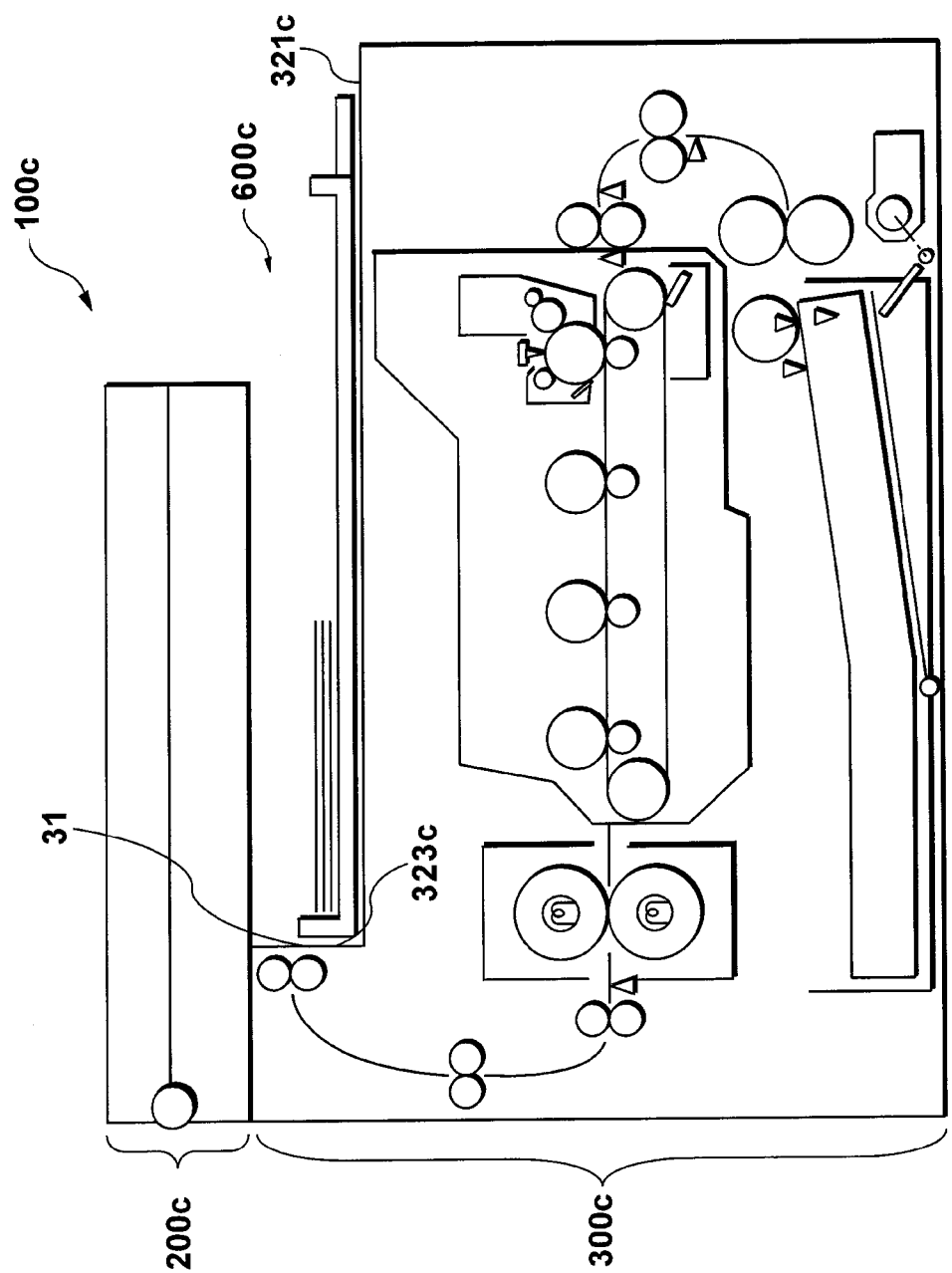
FIG. 9 is a diagram for showing a structure of an image forming apparatus in embodiment 3.

FIG. 9 is a diagram for showing a structure of an image forming apparatus in embodiment 3.

In the image forming apparatus 100 of embodiment 1 of the present invention, the structure is adopted, in which the image reading section 200, the loading plane 321 formed on the upper surface of the print processing section 300, and the upside guide 700 and the underside guide 800 that are attached to the side wall 322, have an inclination with respect to the horizontal plane, however, it is not limited by this, as shown by FIG. 9, but it can also adopt such structure as an image forming apparatus 100c, in which an image reading section 200c, a loading plane 321c formed on the upper surface of a print processing section 300c, and an upside guide 700c and an underside guide 800c that are attached to a side wall 322c, are furnished horizontally.

FIG. 10A is a first explanatory diagram of operation for pulling an ejection tray out in an image forming apparatus of embodiment 3; and FIG. 10B is a second explanatory diagram of operation for an ejection tray out in an image forming apparatus of embodiment 3.

In the image forming apparatus 100c, because an ejection tray 600c does not return because of its own weight, as shown by FIG. 10A, the structure is adopted, in which a fixing part 1100 is furnished on a back wall 323c having the ejection opening 31; and the fixing part 1100 and the back surface of the ejection tray 600c are connected via a coil spring 1004. By this, if the user takes the handle 604 off, as shown by FIG. 10B, by elastic force of the coil spring 1004, the pulled ejection tray 600c moves till the ejection tray 600c approaches the back wall 323c while being guided by the upside guide 700c and the underside guide 800c via the upside roller 602 and the underside roller 603, therefore, it is possible to make the paper ejected from the ejection opening 31 move to a stackable position.

As the image forming apparatus 100c, the structure in which an image reading apparatus, a loading plane formed on the upper surface of a print processing section, and an upside guide and an underside guide that are attached to a side wall are furnished horizontally, it is possible to adopt as transformation of embodiment 2.

Figure 11:
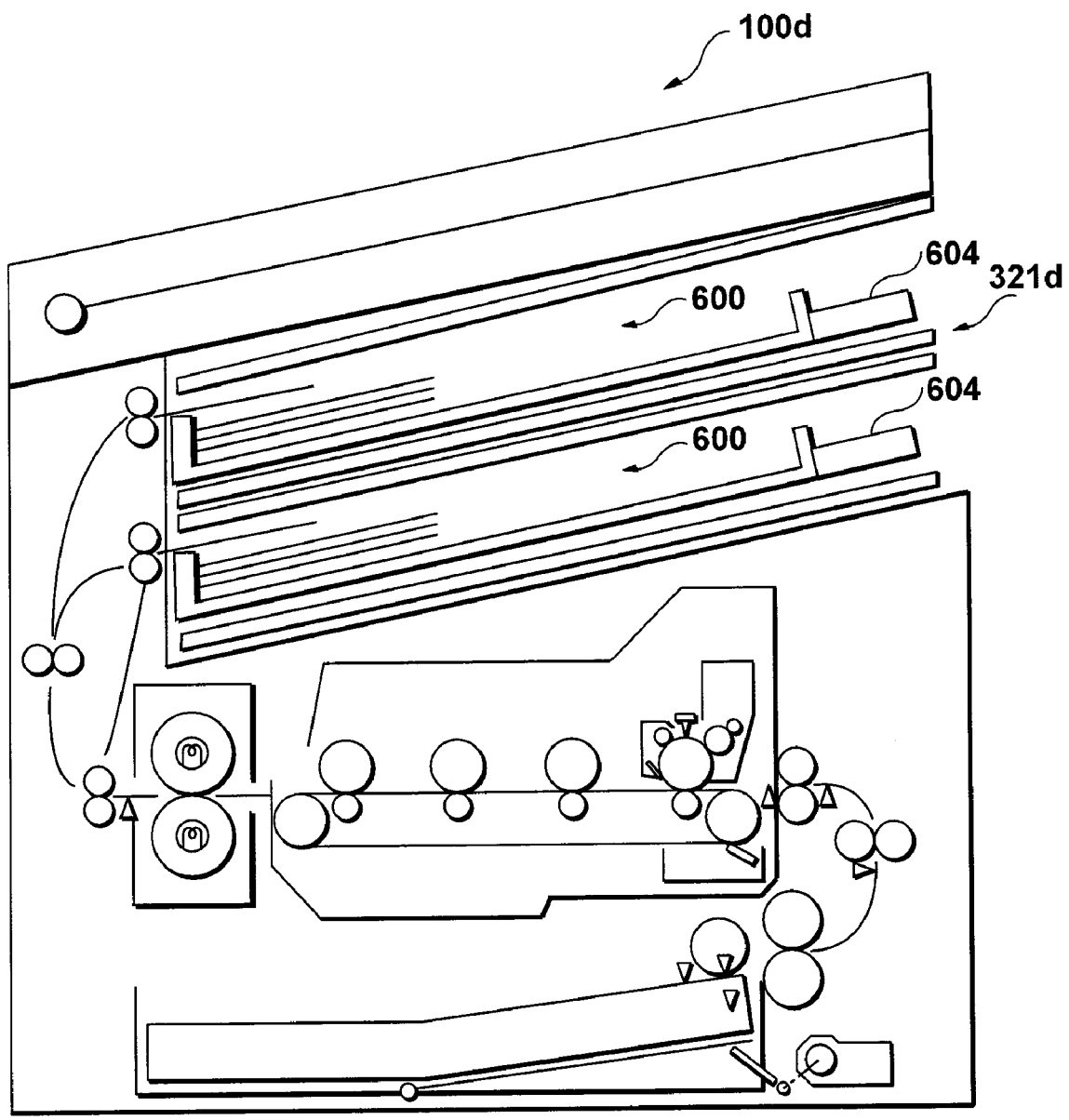
FIG. 11 is a diagram for showing a structure of an image forming apparatus having plural ejection trays.

FIG. 11 is a diagram for showing a structure of an image forming apparatus having plural ejection trays.

In embodiment 1 and embodiment 2 of the present invention, only such structure is explained that one loading plane 321 loads one ejection tray 600, however, it is not limited by this, as shown by FIG. 11, it may adopt to respectively place plural ejection trays 600 along vertical direction; and to attach respective ejection trays 600 so as to be able to pull them by guide section.

Figure 12:
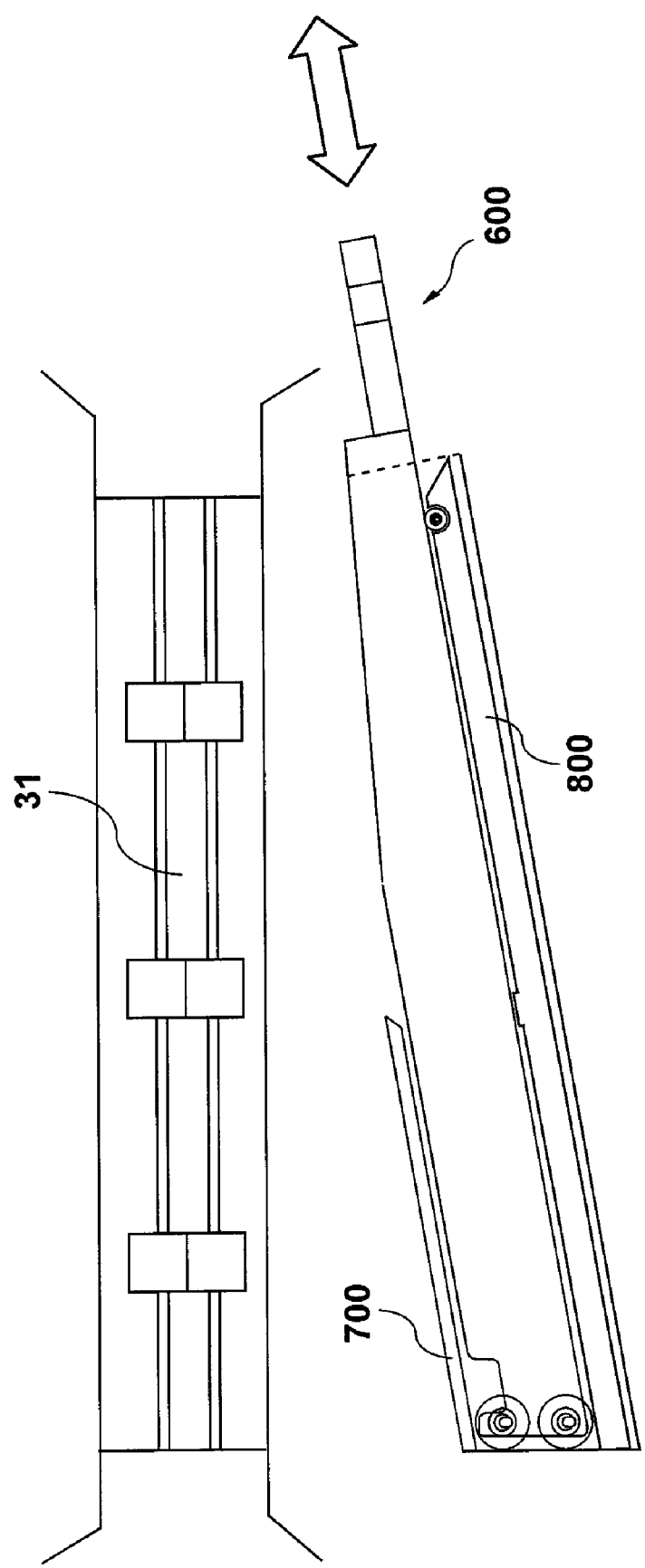
FIG. 12 is a diagram for showing a structure in which an ejection tray is furnished along an orthogonal direction with respect to an ejection opening.

FIG. 12 is a diagram for showing a structure in which an ejection tray is furnished along an orthogonal direction with respect to an ejection opening.

In embodiment 1, embodiment 2 and embodiment 3 of the present invention, only such case is explained that the ejection tray 600 is furnished so as to move along the direction that the paper is ejected from the ejection opening 31, however, it is not limited by this, as shown by FIG. 12, it may adopt to furnish the ejection tray in order that the ejection tray can move along an orthogonal direction with respect to a direction of ejecting the paper. That is, the upside guide 700 and the underside guide 800 are furnished along the orthogonal direction with respect to the ejection direction of the ejection opening 31; and the upside roller 602 and the underside roller 603 of the ejection tray 600 are fit into these guides. Here, the upside guide 700 is attached in order not to become obstruction to ejection process of the paper in the ejection opening 31.

The Utilization Possibility in Industry

In the above embodiments, only such case is explained that the image forming apparatus 100 of the present invention is applied to a MFP which includes the image reading section 200 having scanner function and the print processing section 300 having printer function, however, it is not limited by this, the image forming apparatus 100 of the present invention also can be applied to a MFP which includes at least two of functions of a printer, a copying apparatus, a facsimile, a scanner and the like.

The present invention is not limited to the foregoing embodiments but many modifications and variations are possible within the spirit and scope of the appended claims of the invention.

What is claimed is:

1. An image forming apparatus in which an image reading section is furnished on the upside of a print processing section and an ejection opening is furnished between the image reading section and the print processing section for ejecting a medium that has been printed, comprising:

a loading part that is furnished between the image reading section and the print processing section, and on which the ejected medium is loaded, wherein the loading part includes a body part, a movement member that is movable from the body part together with the ejected medium, and a guide section that guides the movement member to move from the body part along upward slant direction with respect to a horizontal plane.

2. The image forming apparatus according to claim 1, wherein the guide section has an inclination plane that extends slantways;

a coupling part of the movement member couples with the inclination plane.

3. The image forming apparatus according to claim 1, wherein the movement member is movable along a same direction as an ejection direction of the ejected medium.

4. The image forming apparatus according to claim 1, wherein the movement member is movable to an orthogonal direction being at right angles to an ejection direction of the ejected medium.

5. The image forming apparatus according to claim 1, wherein the movement member moves along the upward slant direction whose angle is in a range from 5 degrees to 30 degrees with respect to a horizontal plane.

6. The image forming apparatus according to claim 2, wherein the coupling part is a rotatable rotative body;

when the movement member is pulled out, the rotative body slides on the guide section.

7. The image forming apparatus according to claim 1, wherein the image reading section and upper surface of the print processing section are formed to have a shape with an inclination with respect to a horizontal plane;

in the case that the movement member is furnished on interval between the image reading section and the print processing section, the movement member moves along the ejection direction while sliding on the guide section by weight of the movement member.

8. The image forming apparatus according to claim 2, wherein the inclination plane has an inclination angle that is 5 degrees or over, but 30 degrees or below.

9. The image forming apparatus according to claim 1, wherein the guide section has an inclination plane that extends slantways;

a contacting part of the movement member contacts with the inclination plane;

the image reading section and the upper surface of the print processing section are formed to have a shape with an inclination with respect to a horizontal plane;

in the case that the movement member is furnished on interval between the image reading section and the print processing section, the movement member moves along the ejection direction while sliding on the guide section by weight of the movement member.

10. The image forming apparatus according to claim 1, wherein the movement member moves to a predetermined position with a start of a print process.

11. The image forming apparatus according to claim 1, further comprising:

a position detecting section that detects that the movement member is located near to the ejection opening; and a controlling section that makes the medium eject from the ejection opening when the movement member is detected to be located near to the ejection opening.

12. The image forming apparatus according to claim 1, further comprising:

a position detecting section that detects that the movement member is located near to the ejection opening;

a print start detecting section that detects a start of a print process;

a lock controlling section that locks pulling-out of the movement member when the movement member is detected to be located near to the ejection opening and the start of the print process is detected.

13. The image forming apparatus according to claim 1, wherein the image reading section has a same inclination as that of the movement direction of the movement member.

14. An image forming apparatus in which an image reading section is furnished on the upside of a print processing section and an ejection opening is furnished between the image reading section and the print processing section for ejecting a medium that has been printed, comprising:

a loading part that is furnished between the image reading section and the print processing section, and on which the ejected medium is loaded; and a moving section, wherein the loading part includes a body part and a movement member that is movable from the body part, when the movement member is pulled out to a second position serving as a predetermined pulling-out position from a first position where the movement member is accommodated in the loading part, the moving section makes the movement member move to the first position from the second position.

15. The image forming apparatus according to claim 14, wherein the moving section is a guide member that guides the movement member to the first position from the second position along downward slant direction.

16. The image forming apparatus according to claim 14, wherein the moving section is a force supplying member.

* * * * *